No. 843,001. PATENTED FEB. 5, 1907.
W. H. CLARK.
WHEEL.
APPLICATION FILED APR. 30, 1906.
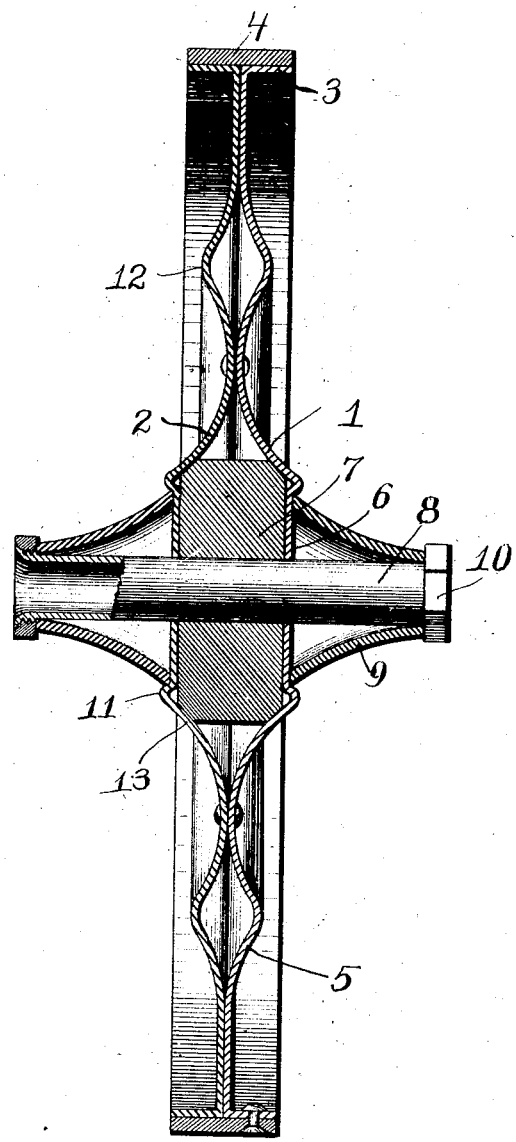
Witnesses:
Elmer R. Shipley
M. S. Belden
William Henry Clark
Inventor
by James W. See
Attorney

UNITED STATES PATENT OFFICE.

WILLIAM HENRY CLARK, OF SALEM, OHIO, ASSIGNOR TO THE W. J. CLARK COMPANY, OF SALEM, OHIO.

WHEEL.

No. 843,001.　　　Specification of Letters Patent.　　　Patented Feb. 5, 1907.

Application filed April 30, 1906. Serial No. 314,339.

*To all whom it may concern:*

Be it known that I, WILLIAM HENRY CLARK, a citizen of the United States, residing at Salem, Columbiana county, Ohio, have invented certain new and useful Improvements in Wheels, of which the following is a specification.

This invention, pertaining to wheels for various uses, but contrived with special reference for use on barrows and trucks, will be readily understood from the following description, taken in connection with the accompanying drawing, which is a vertical diametrical section of a wheel exemplifying my invention.

In the drawing, 1 indicates a metallic disk; 2, a similar disk, the two being placed together back to back; 3, outwardly-turned flanges on the periphery of the disks; 4, a tire engaging the periphery of the flanges; 5, portions of the two disks coming into contact, the disks being formed with annular moldings bringing them apart at places; 6, the flat central portions of the disks separated from each other at considerable distance, a distance equal preferably at least to the width of the tire, 7, a block, preferably of wood, disposed between the central portions of the disks and having a diameter greater than those disk portions; 8, a spindle passing axially through and fitting snugly in central perforations in the disks and block; 9, bell-shaped hollow hubs, their outer ends fitting the spindle and their inner ends fitting against the outer surfaces of the flat central portions of the disks; 10, nuts upon the spindle screwing tightly against the outer ends of the hubs; 11, outwardly-projecting beads margining the flat centers of the disks and engaging around the inner ends of the hubs; 12, a concentric molding projecting outwardly from each disk between the hub and the rim, the disks being separated from each other at this point, the molding to have any cross-section form desired, and 13 outwardly-curved annular portions of the disks where they separate at the central flat portions.

The moldings 12 stiffen the disks, and consequently the wheel, and at the same time enhance the elasticity and the good looks of the structure. The curved expanding portions 13 of the disks brace them at their central portions and merge into the contour of the bell-shaped hubs, resulting in general surfaces of pleasing appearance, easy to clean, and of well-braced form. Block 7, being larger than the flat central portions of the disks, takes corner-bearings against the inner surfaces of the curved annular portions 13 of the disks. The structure thus presents bracing elements in compression extending from the hub ends to the points where the disks are in contact at some considerable distance radially from the wheel-axis, the heads 11 and the block taking the diagonal thrusts when the hubs join the disks. This is particularly important when a heavily-loaded wheel is tipped to a considerable angle, as when dumping a barrow. The nuts upon the spindle cause the hubs to clamp the flat centers of the disks against the block and give to the general center of the structure a very substantial character, well suited to withstand the strains of load and shock as well as side strains. The spindle is manifestly renewable with ease. The nuts are to be screwed up tightly to bring the connected parts under strain, and suitable provision should be made to prevent the loosening of the nuts. Any appropriate nut-lock system may be employed, the illustration showing the nuts countersunk upon their exterior, the metal of the spindle being expanded or riveted into these countersinks to prevent the backing off of the nuts. The spindle is illustrated as being tubular, thus adapting the wheel to run loosely upon a fixed axle; but it is manifest that the system well lends itself to any of the usual spindle provisions of wheels. Regardless of whether the spindle be solid or tubular it is readily removable and renewable in case of wear or other damage. Rivets may, if desired, be employed in securing the tire to the flanges of the disks and securing contacting portions of the disks to each other.

I claim—

A wheel comprising a pair of metallic disks placed back to back and having outwardly-projecting peripheral flanges and having perforated separated flat centers margined by exterior beads, the flat centers joining the body portions of the disk by curves extending from the latter outwardly, a tire on said flanges, a block disposed between the flat centers of the disks, a spindle passing through perforations in the block and in the centers of the disks, bell-shaped hubs disposed upon the spindle and bearing with their inner ends against the flat centers and beads of the disks, the inner ends of the bell-shaped hubs joining the inner portions of the curves uniting the centers and body portions of the disks and their outer ends fitting the spindle, and screw devices connected with the spindle and engaging the outer ends of the hubs and serving to draw the hubs disk-centers and block tightly together, combined substantially as set forth.

WILLIAM HENRY CLARK.

Witnesses:
RALPH W. CAMPBELL,
DAVID BAILEY.